US009207964B1

(12) United States Patent
Gwosdek et al.

(10) Patent No.: US 9,207,964 B1
(45) Date of Patent: Dec. 8, 2015

(54) DISTRIBUTED BATCH MATCHING OF VIDEOS WITH DYNAMIC RESOURCE ALLOCATION BASED ON GLOBAL SCORE AND PRIORITIZED SCHEDULING SCORE IN A HETEROGENEOUS COMPUTING ENVIRONMENT

(71) Applicant: Google Inc., Mountain View, CA (US)

(72) Inventors: Pascal Gwosdek, Zurich (CH); Tawei Liao, Zollikerberg (CH); Kathrin Paschen, Adliswil (CH)

(73) Assignee: Google Inc., Mountain View, CA (US)

( * ) Notice: Subject to any disclaimer, the term of this patent is extended or adjusted under 35 U.S.C. 154(b) by 269 days.

(21) Appl. No.: 13/717,233

(22) Filed: Dec. 17, 2012

Related U.S. Application Data

(60) Provisional application No. 61/727,084, filed on Nov. 15, 2012.

(51) Int. Cl.
*G06F 9/46* (2006.01)
*G06F 17/30* (2006.01)
*G06F 15/80* (2006.01)
*G06F 7/38* (2006.01)
*G06F 9/50* (2006.01)
*G06F 7/76* (2006.01)

(52) U.S. Cl.
CPC ............ *G06F 9/46* (2013.01); *G06F 17/30743* (2013.01); *G06F 7/38* (2013.01); *G06F 7/76* (2013.01); *G06F 9/5066* (2013.01); *G06F 15/803* (2013.01); *G06F 17/3074* (2013.01); *G06F 17/3079* (2013.01)

(58) Field of Classification Search
USPC ............... 718/100, 102, 103; 704/9; 705/7.13
See application file for complete search history.

(56) References Cited

U.S. PATENT DOCUMENTS

| | | | |
|---|---|---|---|
| 6,550,057 B1 | 4/2003 | Bowman-Amuah | |
| 6,938,031 B1 | 8/2005 | Zoltan et al. | |
| 8,260,840 B1* | 9/2012 | Sirota et al. | 709/201 |
| 8,479,242 B1 | 7/2013 | Chen et al. | |
| 8,490,862 B1 | 7/2013 | Minvielle | |
| 8,504,626 B2 | 8/2013 | Nairn et al. | |
| 8,590,052 B2 | 11/2013 | Kruger et al. | |
| 8,856,170 B2* | 10/2014 | Skeen et al. | 707/769 |
| 8,856,869 B1 | 10/2014 | Brinskelle | |
| 8,990,950 B2 | 3/2015 | Kruger et al. | |
| 2007/0033007 A1* | 2/2007 | Narahara et al. | 704/9 |
| 2007/0055647 A1* | 3/2007 | Mullins | G06F 17/30607 |
| 2007/0162434 A1* | 7/2007 | Alessi et al. | 707/4 |

(Continued)

OTHER PUBLICATIONS

Office Action for U.S. Appl. No. 13/732,078, dated Oct. 29, 2014, 48 pages.

(Continued)

*Primary Examiner* — Abdullah Al Kawsar
*Assistant Examiner* — Abu Ghaffari
(74) *Attorney, Agent, or Firm* — Fenwick & West LLP

(57) ABSTRACT

Distribution of various processing tasks is performed for a plurality of comparison objects, such as videos and/or other media content in a matching system. The plurality of comparison objects can include at least one feature that is compared to at least one feature of a plurality of reference objects to determine whether a match occurs in the comparison. Task descriptions corresponding to the processing tasks are distributed with the different processing tasks to a task pool. Matching components select at least one task from the task pool based on the task descriptions.

14 Claims, 10 Drawing Sheets

(56) References Cited

U.S. PATENT DOCUMENTS

| | | |
|---|---|---|
| 2008/0126345 A1* | 5/2008 | Podilchuk .................. 707/5 |
| 2008/0215589 A1* | 9/2008 | Elhaik ........................ 707/10 |
| 2009/0083326 A1 | 3/2009 | Pelton |
| 2009/0144033 A1* | 6/2009 | Liu .................. G06K 9/6226 703/2 |
| 2010/0083346 A1 | 4/2010 | Forman et al. |
| 2010/0135582 A1* | 6/2010 | Gokturk .......... G06F 17/30259 382/195 |
| 2010/0191689 A1 | 7/2010 | Cortes et al. |
| 2011/0004788 A1* | 1/2011 | Petit ............... G06F 17/30351 714/17 |
| 2011/0191428 A1 | 8/2011 | Nairn et al. |
| 2011/0238671 A1 | 9/2011 | Walker et al. |
| 2012/0054194 A1 | 3/2012 | Gao et al. |
| 2012/0167167 A1 | 6/2012 | Kruger et al. |
| 2012/0167197 A1 | 6/2012 | Kruger et al. |
| 2013/0174038 A1 | 7/2013 | Sudhakar Palla et al. |
| 2013/0325341 A1 | 12/2013 | van Os et al. |
| 2013/0325343 A1 | 12/2013 | Blumenberg et al. |
| 2013/0325989 A1 | 12/2013 | Nairn et al. |
| 2014/0046909 A1 | 2/2014 | Patiejunas et al. |
| 2014/0068433 A1 | 3/2014 | Chitturi |
| 2014/0237540 A1 | 8/2014 | King et al. |
| 2014/0310746 A1 | 10/2014 | Larsen et al. |

OTHER PUBLICATIONS

Office Action for U.S. Appl. No. 13/732,078, dated May 7, 2015, 40 pages.

* cited by examiner

DISTRIBUTED BATCH MATCHING OF VIDEOS WITH DYNAMIC RESOURCE ALLOCATION BASED ON GLOBAL SCORE AND PRIORITIZED SCHEDULING SCORE IN A HETEROGENEOUS COMPUTING ENVIRONMENT

CROSS-REFERENCE TO RELATED APPLICATIONS

The subject patent application further claims the benefit under 35 U.S.C. §119(e) of U.S. Provisional Application Ser. No. 61/727,084, filed Nov. 15, 2012, entitled Distributed Batch Matching Of Videos With Dynamic Resource Allocation In A Heterogeneous Computing Environment, which is hereby incorporated by reference in its entirety. The subject patent application is also related to U.S. Provisional Application Ser. No. 61/727,082, filed on Nov. 15, 2012, entitled Systems And Methods For Partitioning A Workload In A Large Scale Media Content Item Match System, which is hereby incorporated in its entirety. The subject patent application is also related to co-pending U.S. patent application Ser. No. 13/732,078, filed on Dec. 31, 2012, entitled Systems And Methods For Partitioning A Workload In A Large Scale Media Content Item Match System, which is hereby incorporated in its entirety.

TECHNICAL FIELD

This disclosure relates generally to receiving and processing media content for distribution, and in particular to distribution of matching processes according to a dynamic resource allocation among a heterogeneous computing environment.

BACKGROUND

Media content hosting sites implement mechanisms for identifying unauthorized videos. Media hosting services that allow users to upload multimedia content (e.g., audio/video content) for mass viewing provide easy distribution of global events regardless of demographic agenda. As volume of hosted media content continues to grow, management of ownership rights pertaining to hosted media content becomes an increasingly challenging problem for hosting services. For music content embedded in an audio or video file, for example, the songwriter, the publisher, and the recording label are just some of the many entities that may hold rights to the media content. For appropriate payments to be made to copyright holders, media content must be correctly identified. However, unlike television and radio environments where the content is typically identified prior to airing, media hosting services often handle user-provided media content that may initially be unidentified. Manual identification of such media content becomes onerous when media hosting sites receive thousands or millions of new media uploads every day, and traditional automated mechanisms lack robustness and scalability required for modern media hosting services.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

Systems and methods disclosed herein relate to distributing different processing tasks for a plurality of comparison objects having at least one feature. A distribution component distributes the processing tasks with corresponding task descriptions to a task pool. Various matching components can individually select a task from the different processing tasks from the task pool based on the task descriptions.

In one example embodiment, a system comprises a memory that stores computer executable components. A processor executes the computer executable components stored in the memory. A distribution component distributes different processing tasks for a plurality of comparison objects having at least one first feature, and corresponding task descriptions to a task pool. A plurality of matching components individually select a task from the different processing tasks from the task pool based on the task descriptions. The matching components generate a comparison between at least a portion of the plurality of comparison objects and at least a portion of a plurality of reference objects having at least one second feature Another example embodiment includes a method that uses a processor to execute computer executable instructions stored in a memory to perform various acts. The method includes distributing different processing tasks for a plurality of comparison objects and corresponding task descriptions to a task pool. The different processing tasks are selected individually from the task pool based on the corresponding task descriptions for a plurality of matching components to process. A comparison is generated for at least one processing task of the different processing tasks between at least a portion of the plurality of comparison objects and at least a portion of a plurality of reference objects to determine whether a match occurs.

Also disclosed herein is a method using a processor to execute computer executable instructions stored in a memory. The method includes partitioning sections of a set of comparison objects and reference objects into subsets to be distributed for different processing tasks. Individual tasks and corresponding task descriptions are distributed to a task pool for determining a match between comparison objects and reference objects according to a set of parameters. A first task is retrieved with a first matching component and a second task with a second matching component according to the corresponding task descriptions. Comparisons are generated between at least a portion of the comparison objects and the reference objects to determine whether a match occurs according to the set of parameters, which can include a duration that the comparison object originate within.

The following description and the annexed drawings set forth in detail certain illustrative aspects of this disclosure. These aspects are indicative, however, of but a few of the various ways in which the principles of this disclosure may be employed. This disclosure is intended to include all such aspects and their equivalents. Other advantages and distinctive features of this disclosure will become apparent from the following detailed description of this disclosure when considered in conjunction with the drawings.

DETAILED DESCRIPTION

Overview

Figure 1:
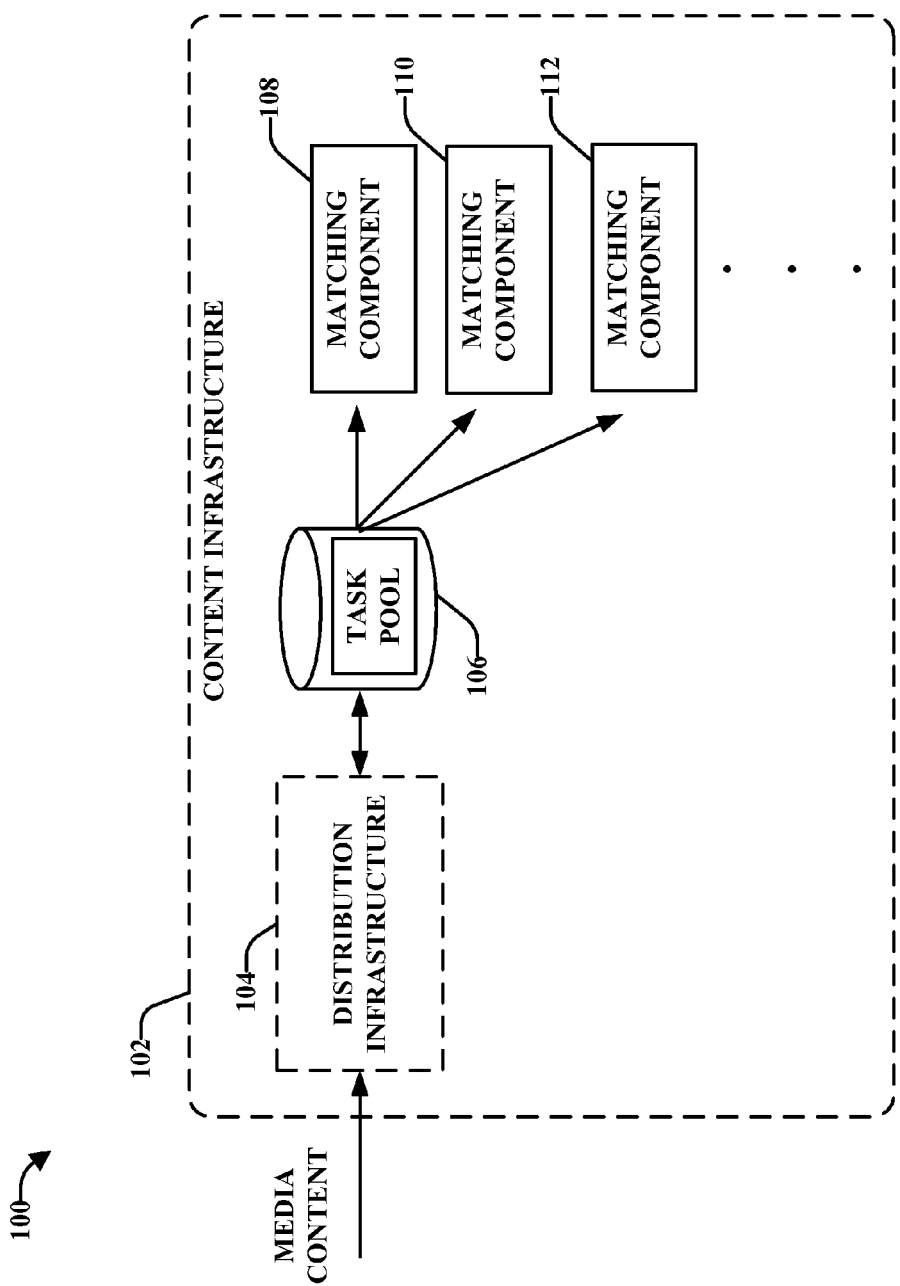
FIG. 1 is a block diagram illustrating an example, non-limiting embodiment of a matching infrastructure in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

In accordance with one or more implementations described in this disclosure, content matching systems include various matching or fingerprinting schemes operating according to infrastructure resources. As a part of the infrastructure, systems can be deployed that are able to match all user-generated videos or user generated content (UGC), numbered in the hundreds of million against reference content provided beforehand, numbered in tens of millions. These operations scale rapidly as additional large volumes having large quantities of reference objects (e.g., video content files, audio content files, etc.) that are added, and can take months to complete.

A large scan of the voluminous content, for example, is performed when additional volumes are obtained with large amounts of reference material in order to reference additional UGC against the new content. Additionally, in cases when a UGC is uploaded (e.g., to the hosting site) before the references related to the UGC, the matching system may not discover a match. To effectively and efficiently scan the large volumes of content and generate comparisons for determining matches within a certain duration, the workload or processing tasks can be divided and distributed to different heterogeneous resources dynamically, such as among different machines or processing devices (e.g., processors, computing systems, networked devices, mobile devices, etc.), for example. Because the number of machines or processing devices available for batch processing at any single locations or data center is limited, and because processing uses backend infrastructure of limited per-location capacity, the workload can be spread or distributed across multiple clusters of the machines in multiple data centers at multiple geographical locations.

The number of available machines, and their computing power, varies by geography, as well as by other factors. Consequently, the infrastructure of the matching system is designed to cope with these variations by the distributed batch matching of videos with a flexible configuration of matching components operating with caching mechanisms. The system operates to distribute the resource-intensive computations (e.g., processing tasks) across multiple data centers, while avoiding duplicate work on computations that can be shared among the matching components. The processing pipeline is separated into shared 'master' components (e.g., distribution components) and many distributed 'workers' (e.g., matching components).

Non-Limiting Examples of Distributed Batch Matching of Videos with Dynamic Resource Allocation in a Heterogeneous Environment Turning now to FIG. 1, illustrated is an example infrastructure system 100 for media content matching in accordance with various aspects described in this disclosure. The system 100 includes a content infrastructure 102 that ingests and/or processes media feeds for video references, which can handle large volumes of media content objects. The content infrastructure 102 includes distribution infrastructure 104, a task pool 106, and one or more matching components 108, 110, and 112, for example.

The content infrastructure 102 comprises a processing pipeline that is separated into the distribution infrastructure 104 including one or more shared 'master' components and many distributed 'workers' (e.g., matching components 108, 110, and/or 112). The distribution infrastructure 104 prepares work (processing tasks) to be performed by the individual matching components 108, 110 and/or 112, which can include any number of matching components. The components described in this disclosure, (e.g., the matching components, components of the distribution infrastructure 104, etc.) can be located at the same or various locations geographically, housed together or separately, while being communicatively coupled to one another as the content infrastructure 102. The distribution infrastructure 104 operates to pre-compute shared data based on UGC and/or media content that includes objects for comparison (comparison objects) against one or more reference objects, which can include media content such as video content, audio content, image content and/or other such media content. The distribution infrastructure 104 splits processing tasks into individual tasks, and submits them into a task pool 106 together with task descriptions.

The task pool 106 can include one or more memories or data stores that store different processing tasks and corresponding task descriptions. The task descriptions can comprise locations or addresses of media content input files including the pre-computed files on the distribution infrastructures as well as general configuration settings and task identifiers for putting individual processing tasks in the context of a larger "match run" or batch run for processing. As such, task description information is used by the matching components 108, 110, 112, and/or supporting infrastructure (e.g., content distribution networks, publisher-subscriber components, etc., for content preparation and delivery) to process the actual matching.

The content infrastructure 102 further includes the matching components 108, 110, 112 that operate as subset managers, which operate to retrieve processing tasks in batches, and process the tasks for matching according to subsets partitioned in the match space. For example, the matching components 108, 110, 112 can further operate to recognize, identify, or otherwise determine an identity of a UGC, a sample media content stream (e.g., video/audio content stream) and/or other media content by matching the media content, or a portion of the media content (comparison object), with known media content (e.g., reference files). The media content, for example, can include video data such as a video performance of a sporting event uploaded to a media hosting service, and the media matching components 108,110, 112 can operate to identify the video by determining a set of reference videos that are similar to the sporting event, which can be operated in parallel, concurrently, and/or at substantially the same time on various different processing task based on a set of parameters. For example, a video can include a performance or a recorded event featuring an original performer. The media matching components 108, 110, 112 are illustrated as part of the same content infrastructure, but the matching components can be at various different locations geographically and/or virtually for processing references that are time sensitive (e.g., live events), and/or integrated with other systems that are not live, such as fingerprinting schemes or matching systems that are not time sensitive. The matching components 108, 110, 112, etc. can also comprise different computer processors, processing devices, personal computer devices, mobile processing devices at different geographical locations, networked on different network connections to the content infrastructure 102 with different data stores for retrieving and storing the processing tasks and corresponding task descriptions from the task pool 106.

In one embodiment, the matching components 108, 110 and/or 112 operate to retrieve processing tasks from the task pool 106 as slices or subsets of a total amount of match space or match volume, and the distribution infrastructure 104 operates to distribute the subsets to the task pool with task descriptions that relate to the subsets of match space and the comparison objects. For example, the match space or match volume can include N user media content items (comparison objects) or, in other words, identifiers that are matched to M reference media content items identifiers (reference objects), wherein N and M are integers. The distribution infrastructure 104 can include distribution components and partitioning components that partition the match space for the pairwise comparisons of comparison objects to be referenced against reference objects. The match space can be represented by N multiplied by M, whereby N is the number of comparison objects and M is the number of reference objects, in which N and M can be integers. Furthermore, the match space can be dynamically adjusted based on changing values of N and M and/or according to a set of priority criteria (e.g., priority scores, classification criteria, and the like).

In another embodiment, the matching components 108, 110, and/or 12 can be coupled to or decoupled from the content infrastructure 102 at any given time and/or from any given location, as well as with additional matching components not shown. The dynamic integration of matching components can happen dynamically based on computing resources coming online/offline, networked/non-networked, and/or in communication with/not in communication with the content infrastructure 102. The matching components 108, 110, 112 can continuously poll the task pool 104 for unclaimed open processing tasks. In response to retrieving such a task, the matching component(s) 108, 110, 112 operate to create a local copy of the files specified in the task description, if the data is not already available in cache, for example.

Figure 2:
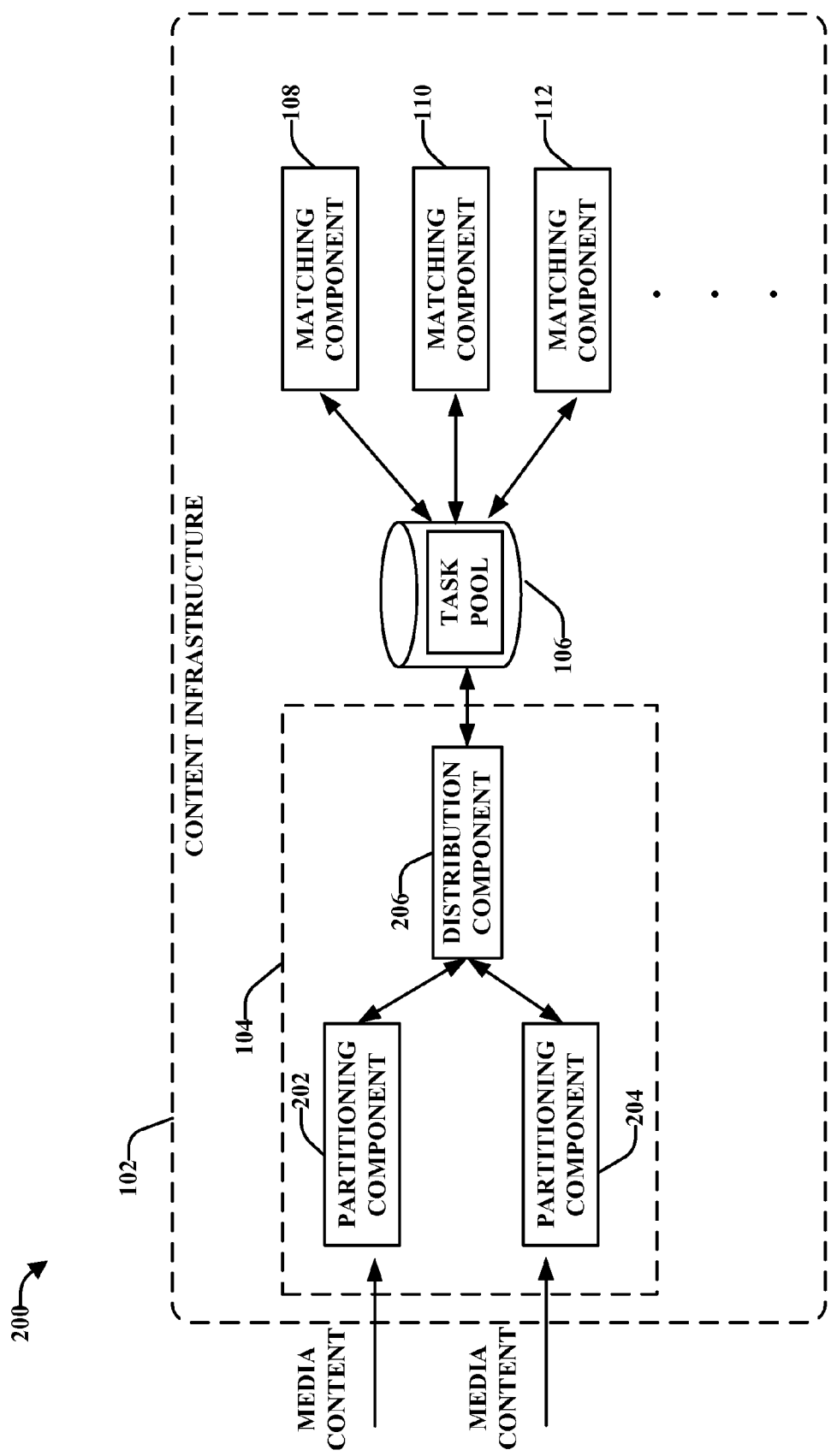
FIG. 2 is a block diagram illustrating an example, non-limiting embodiment of a system with matching components in accordance with various aspects and implementations described herein.

Referring now to FIG. 2, illustrated is a system 200 including the distribution infrastructure 104, the task pool 106 and the matching component 108, 110, and 112 in accordance with various aspects described in this disclosure. As discussed above, the distribution infrastructure 104 operates to receive media content such as UGC, or comparison objects in order to generate a comparison to a set of reference objects for determining matching content.

The content infrastructure 102 receives media content to its processing pipeline from one or different sources (e.g., server, content owners, advertisers, etc.) such as via user uploads, streaming content, server uploads, and/or via other communications from data sources. For example, the media content received can include audio data and/or video data comprising audio fingerprints and/or video fingerprints associated with respective media content items. A fingerprint can be a segment, portion or the entirety of the original media content item, for example, having a characteristics or features to be compared as comparison objects and reference objects.

The distribution infrastructure 104 includes one or more partitioning components 202, 204 (e.g., subset generator components) and a distribution component 206. The partitioning components 202 and/or 204 operate to partition the match space into subsets (batches). Having the media data in the same cluster, for example, can greatly reduce external bandwidth requirements, hence speeding up the matching process significantly. For example, the partitioning components 202, 204 partition a match space of N by M, comprising N user media content items (comparison objects) that are matched to M reference media content items identifiers (reference objects), such as for a predetermined amount of pairwise comparisons to be performed as part of processing tasks within a slice (subset) of the match space. The partitioning components 202, 204 generate more manageable units of work that are smaller than the total sum of subunits forming the match space. For example, each slice or subset of the match space can comprise X number of user videos identifiers (objects) to be matched against Y number of reference identifiers (objects), in which clusters of matching components 108, 110, 112 based on various priority criteria can be assigned to work on the subsets of the match space in parallel or at the same time.

In one embodiment, the partitioning components 202, 204 can operate to divide a match space of the comparison objects and the reference objects according to a set of parameters and partition sections of the match space into one or more subsets, which are distributed to different processing tasks by the distribution component 206. Additionally or alternatively, the subsets of the match space can be further partitioned into smaller units or partial sections of the subsets (e.g., shards) based on priority criteria and/or further on the set of parameters.

For example, the partitioning components 202, 204 operate to partition the match space based on parameters that can include various classification criteria related to the media content objects and/or data corresponding to the comparison/reference objects respectively, such as a length of the media content object (e.g., a video length), a popularity of the object, a view count over a specified period of time, watch time over a specified period of time, geographic location from where the media content was uploaded, identified copyrights, a subject category of the media content item (e.g., music, movies, television shows, animals, history, science, drama, horror, comedy, romantic, soft-rock, adventure, alternative, etc.), specific upload date, specific upload time, a duration from a date or an upload that has lapsed and/or a range of upload dates and times of the media content objects. The partitioning components 202, 204 can utilize the parameters to partition the match space according to comparison media content objects/items and/or reference media content objects/items, in which, for example, the media content can be classified according to a type of reference (e.g., audio and/or video content), reference length, subject category, ownership rights, reference date, and other similar parameters as provided above.

In another embodiment, the partitioning components can further divide the match space into sections/portions of the subsets according to a partitioning function that includes factoring parameters. The parameters can vary and include different criteria such as a number of user videos selected, a number of reference videos selected, a threshold number (e.g., a maximum number) of user videos that can be in a slice (e.g., based on available resources or matching components) and/or a threshold number (e.g., a maximum) of pairwise comparisons to be performed in a section and/or subset.

In one example, a sample result of the partitioning by the partitioning components 202 and 204 can include low view count (e.g., a predetermined threshold minimum) videos less than 60 minutes in length are to be matched against all references in the match space, high (e.g., a predetermined maximum) view count videos of less than 60 minutes in length are to be matched against all references, high view count videos uploaded from the United States in the music category are to be matched against all references with copyrights in the United States, all user videos uploaded in the last 3 days are to be matched against all references, all user videos are to be matched against references from only one particular company, and/or other such results as based on the parameters discussed above.

The partitioning components 202 and 204 operate dynamically in parallel or concurrently at substantially the same time to flexibly divide the match space in different ways according to input data received, which can include data associated with the media content and/or data about the environments in which the matching process will be distributed. For example, popular videos with view count greater than 1000 and less than 60 minutes could be made to be matched against all references; videos with view count less than or equal to 1000 and less than 60 minutes can be partitioned to be matched against all references; and/or remaining videos greater than or equal to 60 minutes regardless of view count could be organized to be matched against all references. In one embodiment, the slices include an equal number of work units (e.g., pairwise comparisons, object comparison task, etc. for matching by the matching components).

Possible environmental scenarios that could affect the partitioning function with associated input data can include a case where an outage has been detected on the system such as with one or more matching components and/or elsewhere and it is promptly fixed. The partitioning components 202, 204, and/or the distribution component 206 can generate and distribute slices of all user videos uploaded between two dates to be matched against all references to compensate for the outage. In another example, an important sport or music event could take place, in which many users can upload videos of the event. If the copyright owner also uploads the reference media content material after the event, the matching system may not adequately match UGC uploaded before the reference content objects. The partitioning components 202, 204 and the distribution component 206, however, operates dynamically to generate subsets of user videos uploaded in the past 3 days to be matched against the specified high value reference material, in order to detect matching content among the user videos uploaded before the reference.

In yet another example, high view count popular videos that are trending are more important than low view count videos and can create more business value as advertising placed on popular trending videos reaches a wider audience. To protect high value content, the partitioning components and distribution components can identify and prioritize them.

Figure 3:
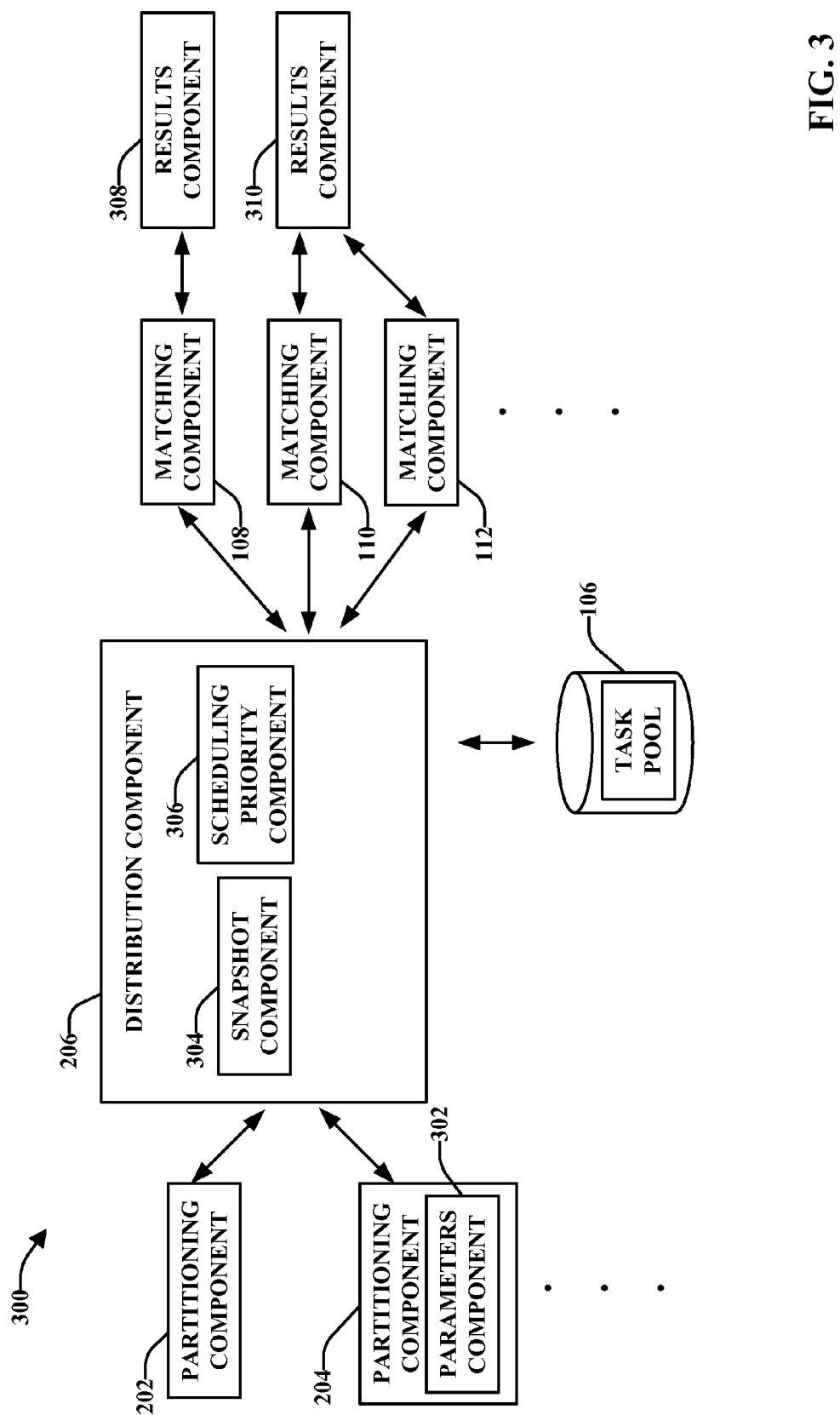
FIG. 3 is a block diagram illustrating an example, non-limiting embodiment of a system in accordance with various aspects and implementations described herein.

Referring now to FIG. 3, illustrated is a system 300 that facilitates matching processes across various heterogeneous environments and resources according to various embodiments described. The distribution component 206 controls pre-processing of shared data among the matching components and associated processing components. The distribution components 206 generates processing tasks according to input data received, and can distribute the processing tasks involved in matching processes to the task pool 106 with corresponding task descriptions or task data. The task descriptions or task data, for example, can include locations of input files (e.g., media content, associated data related to the parameters discussed above and to the media content objects), configuration settings, and/or task identifiers for batch processing of different slices, and/or smaller sections of slices based on the dynamic computing environment, resource availability, set parameters and/or priority criteria, and/or other task description data received at the system 300. The distribution component 206 includes a snapshot component 304, and a scheduling priority component 306. Partitioning components 202 and/or 204 can include a parameters component 302.

The parameters component 302 facilitates setting of the parameters for generating the subsets of match space, sections of the subsets, allocating resources, variables to partitioning functions or equations for determining the partitions, and/or manages input data and computing resources for task distributions according to the parameters set. For example, inputs can set the parameters that include the classifications and/or parameter settings according to the criteria discussed above, such as a length of the media content object (e.g., a video length), a popularity of the object, a view count over specified period of time, an watch time over a specified period of time, geographic location from where the media content object was uploaded, identified copyrights with any object, a subject category of the media content object (e.g., music, movies, tv shows, animals, history, science, drama, horror, comedy, romantic, soft-rock, adventure, alternative, etc,), specific upload date, specific upload time, a duration from a date or an upload that has lapsed and/or a range of upload dates and times of the media content objects, ownership, and the like.

The snapshot component 304 maintains the comparison objects static while changing a reference object of the plurality of reference objects that correspond to the different processing tasks. Alternatively, the snapshot component 304 can maintain the plurality reference objects static while changing comparison objects of the plurality of comparison objects that correspond to the different processing tasks. For example, the static portion (comparison objects or reference objects, which are associated with the different processing tasks for matching) includes a set of files and/or input data that is pre-computed and associated with the processing task as task description data for matching by the matching components 108, 110, 112. Consequently, the number of files and/or amount of data to be copied for processing tasks can be reduced by saving files pertaining to the objects set for processing in batches or subsets of the match space.

In one embodiment, the snapshot component 304 operates to store multiple different snapshots (e.g., processing files according to stored parameters, input data, task descriptions) of groups of slices and/or portions (sections) of slices to enable processing of several different sets of UGC and references in parallel, at the same time, simultaneously, concurrently, or at substantially the same time. For example, the matching components 108, 110, 112 can retrieve work from a single match run or, in other words, from a slice or section of a slice for making comparisons of objects to determine a match. Files are re-used if possible and do not need to redundantly copied, which reduces bandwidth significantly.

The distribution component 206 operates to offer and distribute processing tasks to various matching components based on a prioritized scheduling scheme managed by the scheduling priority component 306. The prioritized scheduling scheme can include a priority measures or priority scores that are determined based on a similarity function, for example. The matching components 108, 110, 112 individually select a task from the different processing task based on a prioritized scheduling score and the task descriptions that include location data for shared information on the distribution component having configuration settings and task identifiers related to the comparison objects or the reference objects. As such, the priority of a batch having a set of slices and/or sections of slices controls the frequency with which tasks from the task pool 106 are retrieved or distributed relative to other batches waiting to be worked on.

Partitioning components 202 and 204 can operate subsets or slice the match space further into smaller work units running on a pool of computers or the task pool 106 in a cluster. For example, one subset of the match space can be broken down into 1000 smaller work units running on 1000 different computers in a cluster. Because longer videos take longer to match, a subset of match space that contains a highly heterogeneous set of user videos, comprising of short and long videos, for example, processing components matching the shorter videos can be stalled waiting for the longer videos to finish processing. To mitigate the stalling, user videos of approximately the same length can be grouped into the same subsets of match space or slices. The priority schedule component 306 operates to perform scheduling of operations based on the inputted parameters. The matching components 108, 110, and/or 112 can thus finish matching that subset of match space around the same time for a better use of computing resources based on the subset partitions. Although the example above compares videos of various lengths, other characteristics that vary among videos and/or media content can also be used to define subsets of match space, as discussed above with regard to various parameters or criteria.

Another reason for partitioning the match system into subsets (slices) of different categories is that different priorities can be assigned to the different subset categories. For example, protecting copyright content after a high profile live sport or music event can be more important than the average home pet video from a business standpoint. The match system can thus process different "match runs," sets of slices and/or sections of a slice at different priorities and/or according to different categories.

Because matching components 108, 110, 112 are isolated as clients or customers to the task pool 106, the matching components do not require any a priori knowledge or data about the context of the match run or slices they are processing. Rather, the matching components work on different processing tasks or atomic steps of solving the task based on the descriptions in a provided protocol buffer, and forward their results to a publish-subscribe messaging system (not shown) to publish the content accordingly. The results can be picked up and forwarded by results components 308 and 310, for example, which operate as post-processing processors that generate large table writes of the media content. The results components 308 and 310 can be located to an additional services or network environment because of the large volumes of data being written to a storage memory, which enables a more efficient load balancing and scaling of resources without stalling the processes of the matching components performing comparisons. The results components 308 and 310 can assist in improving the performance of the matching components and can be separate from one another to process two different task processes. Communications from the matching components and the result components can be accomplished via publisher-subscriber messaging systems and/or load-balanced direct remote procedure calls, for example.

Figure 4:
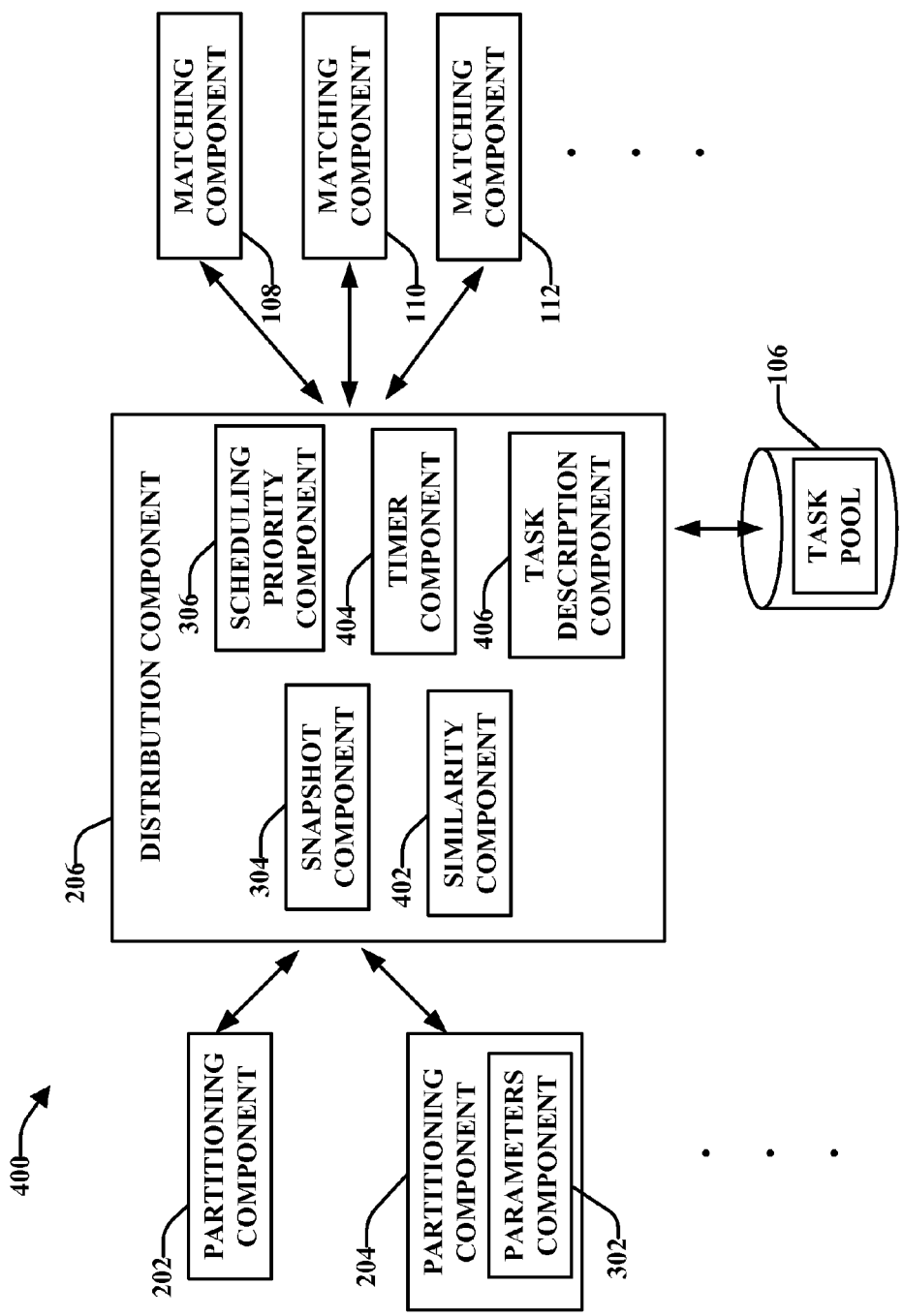
FIG. 4 is a block diagram illustrating an example, non-limiting embodiment of a system in accordance with various aspects and implementations described herein.

Referring to FIG. 4, a system 400 includes similar components as discussed above for partitioning and distributing processing tasks for matching in accordance with various embodiments described. The distribution component 206 further includes a similarity component 402, a timer component 404, and a task description component 406.

The distribution component 206 maintains the state of the overall progress of all match runs and/or of the processing tasks for matching objects of the subsets of match space. The distribution component 206 translates or coordinates between the input-driven contexts of the individual runs, such as for UGC and newly uploaded content, and with the task-driven context of the matching components. The distribution component 206 monitors the state of all match runs, attaches working components onto a central dashboard, and manages the task pool 106 authoritatively.

The similarity component 402 determines a similarity between the cached information of the different processing tasks based on a similarity function and communicates to the snapshot component 304 which objects to maintain as static and which objects to change for the different processing tasks based on the determined similarity for reducing redundant copies being made of the cached information. This caching mechanism is applicable even when running multiple match runs concurrently. Because a matching component can be involved in the computation of tasks from multiple match runs, matching components can preserve the files or description data for more than one match run in a local cache snapshot. To this end, a configurable number of snapshot folders maintained for the matching components 108, 110 and 112, such as with the snapshot component 304, and a similarity function between these folders and a new task is used to determine which snapshot to use during the upcoming computation.

For example, the similarity component 402 operates the similarity function, which classifies files by the attribute they are describing ('defines the reference space', 'defines the UGC space'), and assigns a score based on the number of classes in which all files agree. The snapshot with the highest score is picked In one example: consider four files ("ref1", "ref2", "ugc1", and ugc2", with "ref1" and "ref2" as "belonging to a reference description", and "ugc1" and "ugc2" be classified as "belonging to a UGC description". This classification is implicitly comprised in the task description. Further, let the remote location of "ugc1" have changed since the last processing run, while all other files remained the same. Since "ref1" and "ref2" did not change, a reference score of 1 is obtained. Among "ugc1" and "ugc2" there was a change which results in a UGC score of 0. Hence, the global score of this snapshot will be 1+0=1.

If more than one snapshot has the same best score, the oldest one can be selected. The same holds if all snapshots have score 0, in which case either an empty folder is used if available, or else the oldest folder is selected and wiped clean. Since the wipe only affects the local copy, but not the remote original files, such a wipe is safe to perform. As a result of this caching, significantly less files are copied across long distances which saves a lot of bandwidth. As a consequence, the time it takes to cache files reduces by more than one order of magnitude (e.g., from an hour to minutes).

Additionally or alternatively, the similarity component 402 can operate the similarity function according to factors or variables that include the accumulated size of all the files that it would preserve if it picked a particular folder, the number of files that it would preserve in this case, and/or other measures that approximate and/or describe the effort to copy data from a remote location to local cache folders. Further, the factors of the similarity function can be weighted in various combinations. The caching process for one slice may be executed in parallel to a computation for another slice on the same processing or matching component. This interleaves bandwidth-limited and computationally bounded processes and allows for a better resource optimization.

In another embodiment, matching components 108, 110, and 112 can actively filter the offered tasks in the task pool 106 for ones which are scheduled in the near future, and which have a similar configuration of inputs as one of the cached snapshots. This strategy allows for skipping tasks temporarily in favor of other tasks that can immediately be processed without a significant effort on copy operations. If no matching component picks up a task for a certain time although it has top priority, its processing can be enforced by the distribution component 206. Hence, at least one of the matching components will cache the necessary files and will automatically pick up new tasks from the same match run since most of the data is already available or cached.

Additionally or alternatively, the pre-computation of shared data as it is performed by the partitioning components 202, 204 can be delegated to the worker components (matching components). In this case, the steps are suitably encoded into a task description and submitted to the task pool, where they can be processed with a higher priority than any other task.

The timer component 404 tracks an amount of time that a matching component 108, 110, 112 generates the comparison for a processing task. The distribution component 206 monitors a state of the different processing tasks that are distributed to the task pool and selected by the matching components, and further re-distributes the processing task to a different matching component in response to the amount of time satisfying a threshold function, such as a maximum and/or minimum threshold being satisfied.

The task description component 406 maintains and associates corresponding task descriptions to processing tasks for distribution to the matching components 108, 110, and/or 112. As noted above, the corresponding task descriptions include location data for information on the distribution component, configuration settings and task identifiers related to the plurality of comparison objects or the plurality of reference objects. The matching components can select tasks based on a priority description, and decouple and couple to the task pool independently from one another at any given time.

Figure 5:
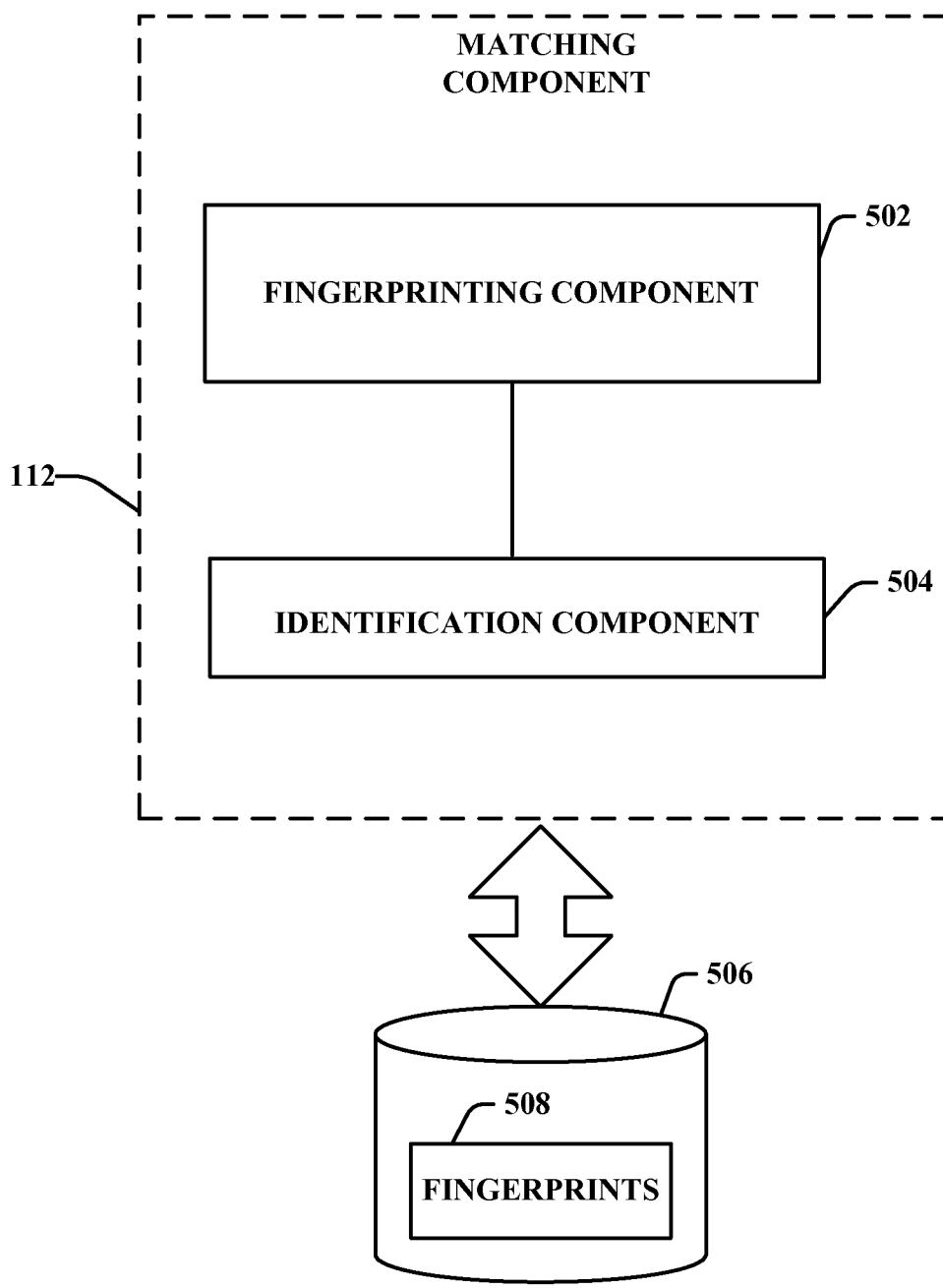
FIG. 5 is a block diagram illustrating an example, non-limiting embodiment of a matching component in accordance with various aspects and implementations described herein.

Referring to FIG. 5, illustrates the matching component 112 in accordance with various embodiments described. The media matching component 112 includes a fingerprinting component 502, and an identification component 504. The fingerprinting component 502 determines, provides, or otherwise generates an identifier or fingerprint using features included in the media content stream. For example, in one implementation, characteristic features can be used to generate a fingerprint, such as audio features that can include melodic characteristics of the media content.

The identification component 504 determines whether any references or reference files are similar to the sample media content, and recognizes, categorizes, or otherwise identifies the reference files that are similar to the media received using the fingerprint generated by the fingerprinting component 502. In one implementation, the identification component 504 compares the fingerprint, or a portion of the fingerprint, for the media content against a set of fingerprints 508 (or identifiers) for references, and determines a set of references (media files) that are similar to the media content received (probe content) based at least in part on a set of similarity criteria. The similarity criteria can include but are not limited to satisfying a predetermined similarity threshold.

As an additional or alternative example, the identification component 504 can employ the fingerprint to lookup reference files that are similar to the media content received. For instance, the fingerprint can include a set of hash values, and the identification component 504 can employ the set of hash values to lookup a fingerprint in the set of fingerprints 508 for a reference file, e.g., using a hash table. It is to be appreciated that although the set of fingerprints 508 are illustrated as being maintained in a data store 506, the set of fingerprints 120 can be maintained in another location and the identification component 504 can access the set of fingerprints 508, for example, via a network connection.

Figure 6:
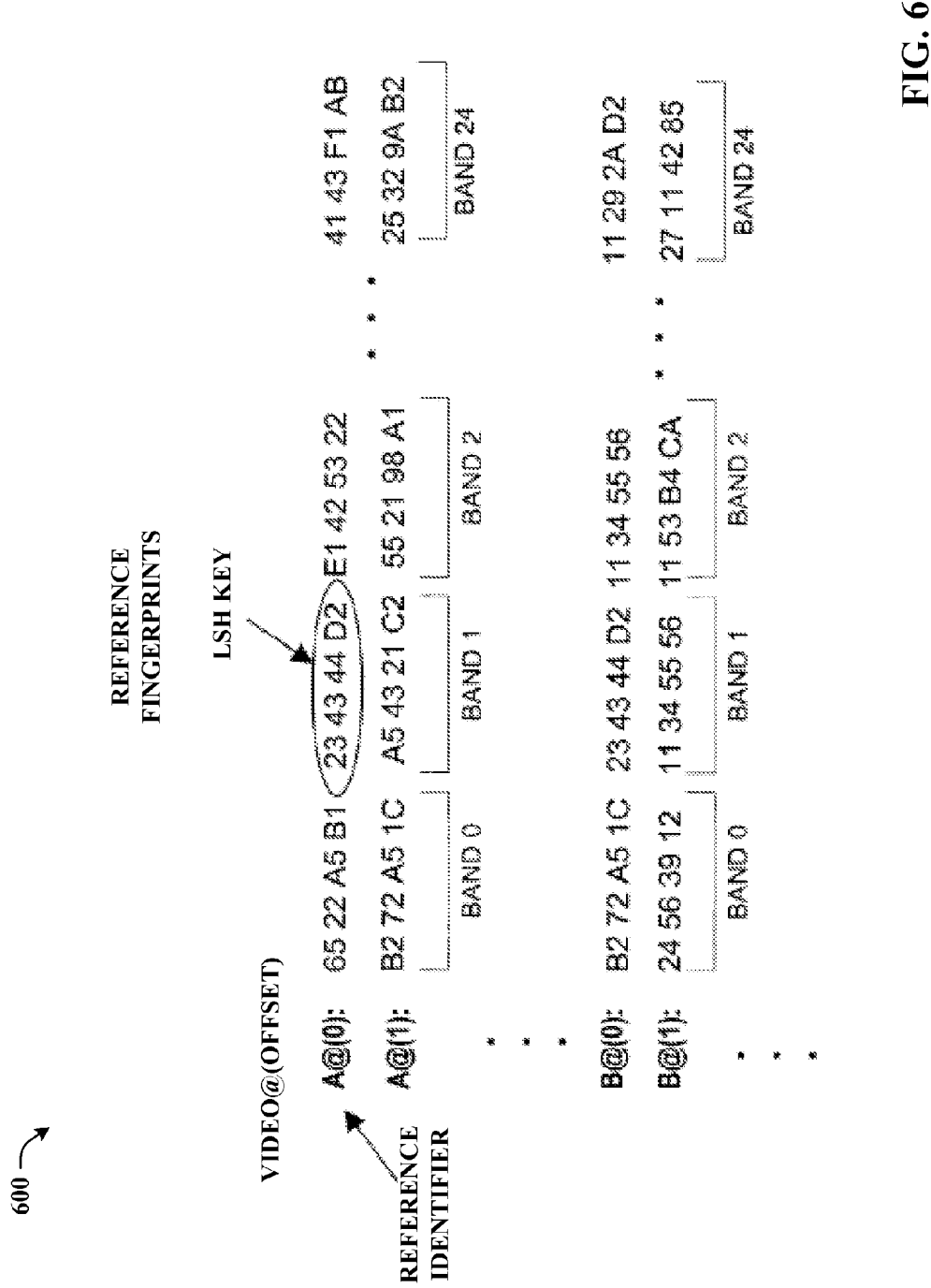
FIG. 6 illustrates examples of reference fingerprints in accordance with various aspects and implementations described herein.

FIG. 6 illustrates examples of reference objects or fingerprints 600 for indexing according to a Locality Sensitive Hashing (LSH) process that can be implemented by one or more matching components according to work distributed and/or retrieved from a task pool with a set of task descriptions. Each object or fingerprint is referenced by a reference identifier indicating the corresponding reference video and segment represented by the fingerprint. For example, fingerprint A@(0) identifies a fingerprint representing the segment of video A at an offset index 0, A@(1) identifies a fingerprint representing the segment of video A at an offset index of 1, and so on. Each fingerprint comprises a sequence of values (e.g., 100 byte values per fingerprint). The sequence of values is divided into a number of LSH bands (band 0, band 1, etc.) with each band corresponding to a subset of values in the fingerprint. For example, LSH band 0 comprises the first four values of the fingerprint; LSH band 1 comprises the next four values of the fingerprint, and so on, in one embodiment, the indexing component 206 divides the fingerprints into 25 LSH bands with each band comprising four byte values. The set of values within a given LSH band is referred to as a "key". For example, fingerprint A@(0) contains the key (23, 43, 44, D2) in LSH band 1.

Figure 7:
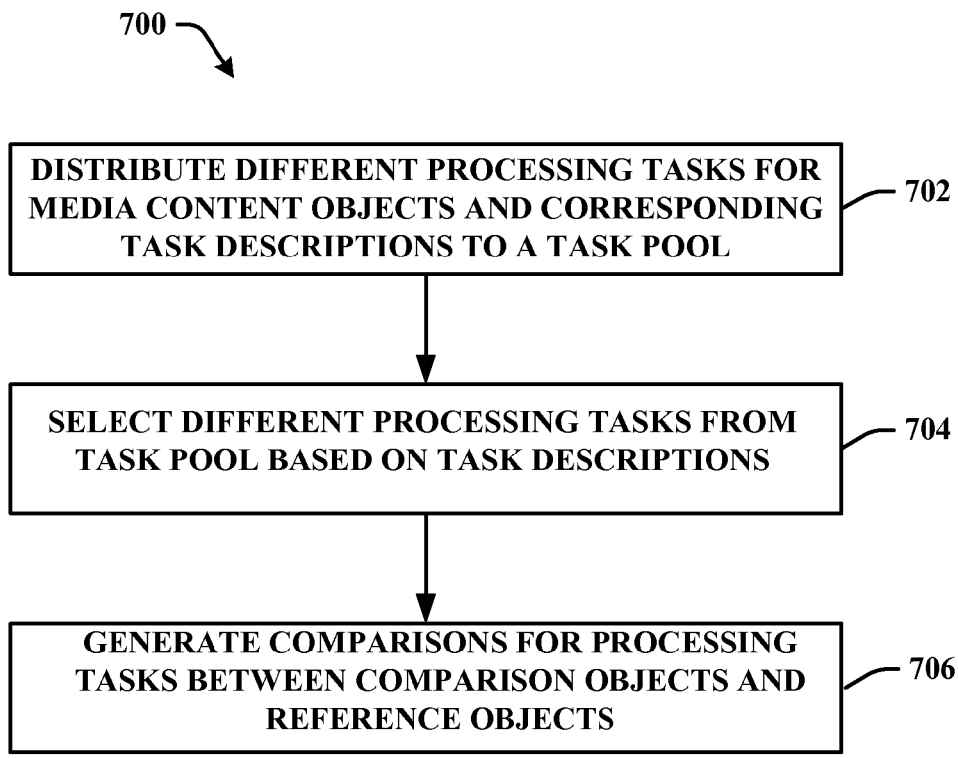
FIG. 7 illustrates a flow diagram of an example, non-limiting embodiment for a matching system in accordance with various aspects and implementations described herein.
Figure 8:
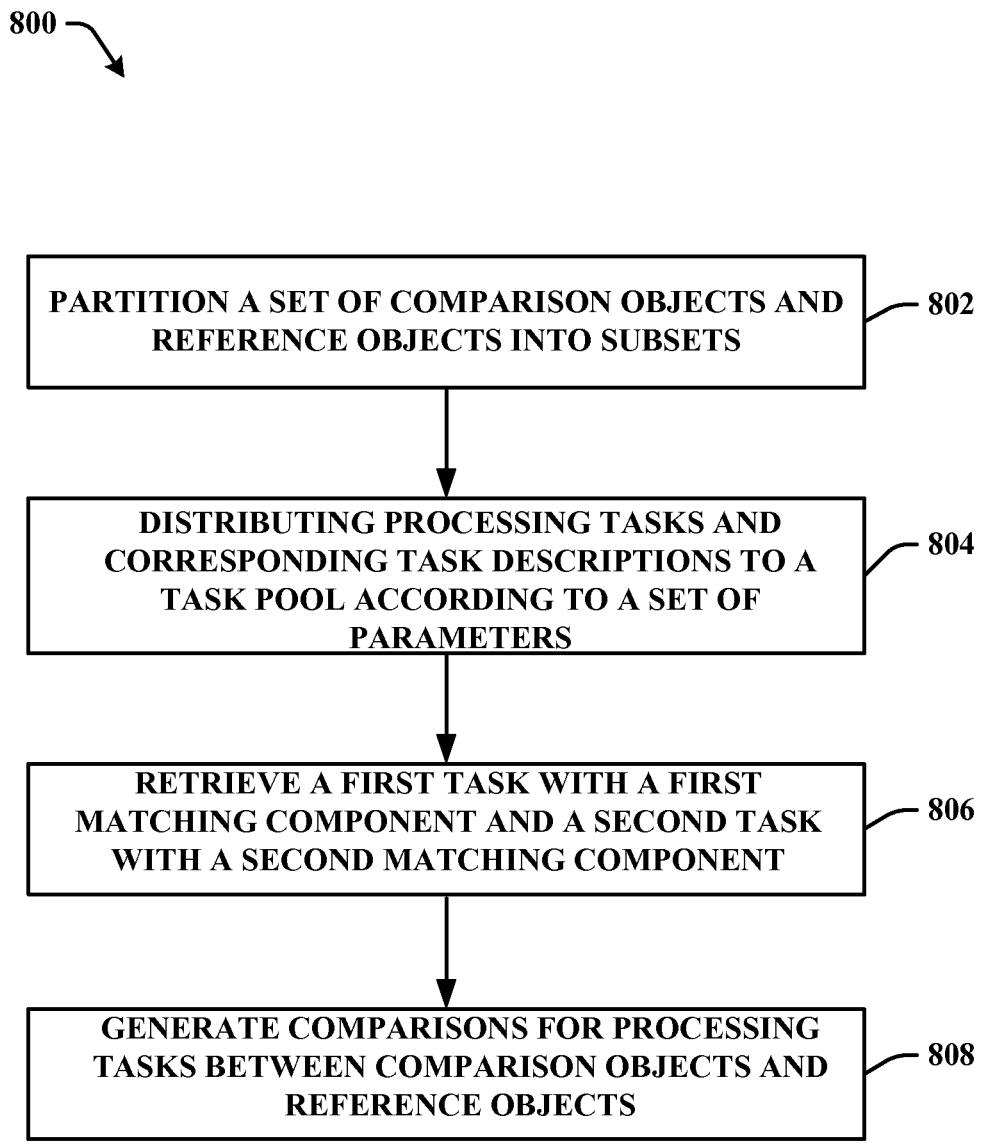
FIG. 8 illustrates a flow diagram of an example, non-limiting embodiment for a matching system in accordance with various aspects and implementations described herein.

Non-Limiting Examples of Distributed Batch Matching of Videos with Dynamic Resource Allocation in a Heterogeneous Computing Environment FIGS. 7-8 illustrate various methodologies in accordance with the disclosed subject matter. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 7, illustrated is an example methodology 700 for a matching system using a processor to execute the computer executable instructions stored in a non-transitory memory to perform acts in accordance with various aspects described in this disclosure. At reference numeral 702, distributing different processing tasks are distributed media content objects, such as a plurality of comparison objects with corresponding task descriptions to a task pool.

At 704, the different processing tasks are individually selected from the task pool based on the corresponding task descriptions for a plurality of matching components to process.

At 706, at least one comparison is generated for at least one processing task of the different processing tasks between at least a portion of the plurality of comparison objects and at least a portion of a plurality of reference objects to determine whether a match occurs.

In one embodiment, at least one subset of a match space of the plurality of comparison objects and the plurality of reference objects can be generated according a set of parameters, and sections of the one or more subsets can be partitioned to be distributed as the different processing tasks. The method 700 can include maintaining the plurality of comparison objects static while changing a reference object of the plurality of reference objects that correspond to the different processing tasks. Additionally or alternatively, the plurality of reference objects can be kept static while changing comparison objects of the plurality of comparison objects that correspond to the different processing tasks.

In another embodiment, a similarity between a set of cached information of the different processing tasks and an additional task can be made based on a similarity function. A determination can be made whether to maintain the plurality of reference objects or the plurality of comparison objects as static and change the plurality of comparison objects or the plurality of reference objects respectively for the different processing tasks based on the determined similarity to reduce redundant copies being made of the cached information.

A distribution component, for example, can monitor a state of the different processing tasks that are distributed to the task pool and selected by the plurality of matching components to process. At least one processing task can be re-distributed from at least one matching component of the plurality of matching components to a different matching component in response to the state of the at least one processing task. The re-distribution and the stated being monitored for the tasks can be based on an amount of time for processing the at least on processing task. The different processing tasks processed at the matching component can be performed while using shared cached information of the cached information from other processing tasks operations.

FIG. 8 illustrates an example methodology 800 for a matching system using a processor to execute the computer executable instructions stored in a non-transitory memory to perform acts in accordance with various aspects described in this disclosure. At reference numeral 802, a set of comparison objects and reference objects in a match space are partitioned into subsets to be distributed for different processing tasks.

At 804, the individual tasks of the different processing tasks and corresponding task descriptions are distributed to a task pool for determining a match between comparison objects and reference objects according to a set of parameters.

At 806, a first task is retrieved with a first matching component and a second task is retrieved with a second matching component according to the corresponding task descriptions for the first task and the second task.

At 808, comparisons are generated between at least a portion of the comparison objects and the reference objects to determine whether a match occurs based on the set of parameters including a duration that the comparison object originate within.

The task descriptions include location data for cached information related to processing of the individual tasks, and cached information can be shared to process the individual tasks among the first matching component and the second matching component depending upon whether the comparison objects or the reference objects are kept constant during the comparisons.

The method 800 can include determining whether to maintain the plurality of reference objects or the plurality of comparison objects as static and change the plurality of comparison objects or the plurality of reference objects respectively for the different processing tasks based on a similarity function to reduce redundant copies being made of the cached information.

In embodiment, the different processing task can be filtered at the first matching component and/or the second matching component for the individual tasks scheduled to be processed that have similar task descriptions. The task descriptions can include, for example, location data for information on the distribution component, configuration settings or task identifiers related to the comparison objects or the reference objects for matching operations.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in mechanisms as described for various embodiments of this disclosure.

Figure 9:
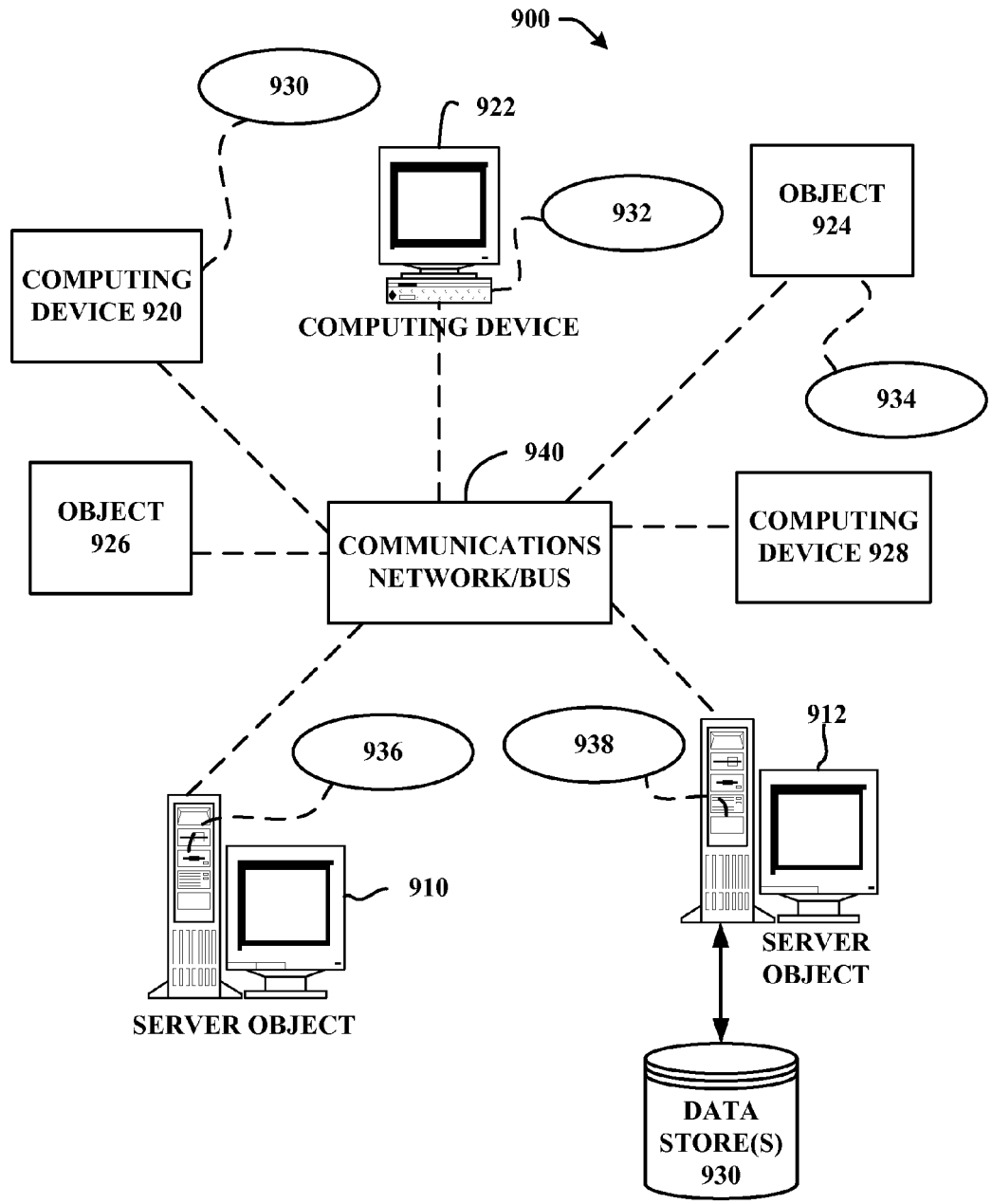
FIG. 9 is a block diagram illustrating an example computing device that is arranged in accordance with various aspects and implementations described herein.

FIG. 9 provides a schematic diagram of an exemplary networked or distributed computing environment. The distributed computing environment comprises computing objects 910, 912, etc. and computing objects or devices 920, 922, 924, 926, 928, etc., which may include programs, methods, data stores, programmable logic, etc., as represented by applications 930, 932, 934, 936, 938. It can be appreciated that computing objects 99, 912, etc. and computing objects or devices 920, 922, 924, 926, 928, etc. may comprise different devices, such as personal data assistants (PDAs), audio/video devices, mobile phones, MP3 players, personal computers, tablets, laptops, etc.

Each server object 910, 912, etc., objects 924, 926, and computing devices 920, 922, 928, etc. can communicate with one or more other server object 910, 912, etc., objects 924, 926, and computing devices 920, 922, 928, etc. by way of the communications network 940, either directly or indirectly. Even though illustrated as a single element in FIG. 9, network 940 may comprise other server objects, objects, and computing devices that provide services to the system of FIG. 9, and/or may represent multiple interconnected networks, which are not shown. Each server object 910, 912, etc., objects 924, 926, and computing devices 920, 922, 928, etc. can also contain an application, such as applications 930, 932, 934, 936, 938, that might make use of an API, or other object, software, firmware and/or hardware, suitable for communication with or implementation various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be employed. The "client" is a member of a class or group that uses the services of another class or group to which it is not related. A client can be a process, e.g., roughly a set of instructions or tasks, that requests a service provided by another program or process. The client may be or use a process that utilizes the requested service without having to "know" any working details about the other program or the service itself.

In a client/server architecture, particularly a networked system, a client is usually a computer that accesses shared network resources provided by another computer, e.g., a server. In the illustration of FIG. 9, as a non-limiting example, objects 924, 926, and computing devices 920, 922, 928, etc. can be thought of as clients and server objects 910, 912, etc. can be thought of as servers where server objects 910, 912, etc. provide data services, such as receiving data from client objects 924, 926, and computing devices 920, 922, 928, etc., storing of data, processing of data, transmitting data to client objects 924, 926, and computing devices 920, 922, 928, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network/bus 940 is the Internet, for example, the server objects 910, 912, etc. can be Web servers with which the client objects 924, 926, and computing devices 920, 922, 928, etc. communicate via any of a number of known protocols, such as the hypertext transfer protocol (HTTP). Server objects 910, 912, etc. may also serve as client objects 924, 926, and computing devices 920, 922, 928, etc., as may be characteristic of a distributed computing environment.

Exemplary Computing Device

As mentioned, advantageously, the techniques described herein can be applied to any device suitable for implementing various embodiments described herein. Handheld, portable and other computing devices and computing objects of all kinds are contemplated for use in connection with the various embodiments, e.g., anywhere that a device may wish to read or write transactions from or to a data store. Accordingly, the below general purpose remote computer described below in FIG. 10 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 10:
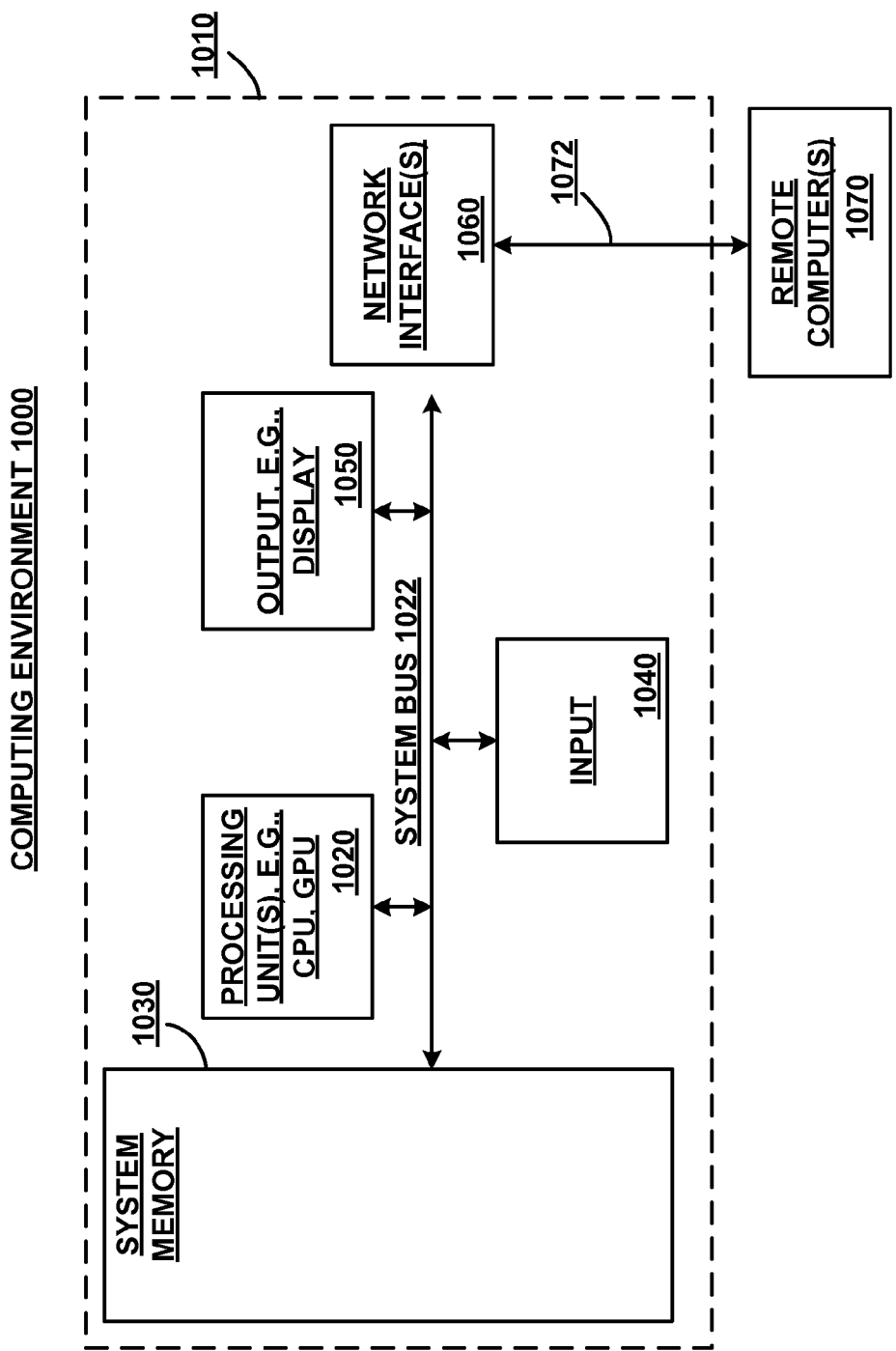
FIG. 10 is a block diagram illustrating an example networking environment in accordance with various aspects and implementations of this disclosure.

FIG. 10 thus illustrates an example of a suitable computing system environment 1000 in which one or aspects of the embodiments described herein can be implemented, although as made clear above, the computing system environment 1000 is only one example of a suitable computing environment and is not intended to suggest any limitation as to scope of use or functionality. Neither is the computing environment 1000 be interpreted as having any dependency or requirement relating to any one or combination of components illustrated in the exemplary operating environment 1000.

With reference to FIG. 10, an exemplary remote device for implementing one or more embodiments includes a general purpose computing device in the form of a computer 1010. Components of computer 1010 may include, but are not limited to, a processing unit 1020, a system memory 1030, and a system bus 1022 that couples various system components including the system memory to the processing unit 1020.

Computer 1010 includes a variety of computer readable media and can be any available media that can be accessed by computer 1010. The system memory 1030 may include computer storage media in the form of volatile and/or nonvolatile memory such as read only memory (ROM) and/or random access memory (RAM). By way of example, and not limitation, memory 1030 may also include an operating system, application programs, other program modules, and program data.

A user can enter commands and information into the computer 1010 through input devices 1040. A monitor or other type of display device is also connected to the system bus 1022 via an interface, such as output interface 1050. In addition to a monitor, computers can also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1072, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to publish or consume media in a flexible way.

The word "exemplary" is used herein to mean serving as an example, instance, or illustration. For the avoidance of doubt, this matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media. Computer-readable storage media can be any available storage media that can be accessed by the computer, is typically of a non-transitory nature, and can include both volatile and non-volatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a component can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A system comprising:
   a memory that stores computer executable components;
   a processor that executes the following computer executable components stored in the memory:
   a distribution component configured to:
   distribute distinct processing tasks, associated with a match space for a pairwise comparison of a plurality of comparison objects and a plurality of reference objects, to a task pool, wherein respective processing tasks comprise task descriptions related to a subset of the plurality of comparison objects and the plurality of reference objects for which the pairwise comparison will be performed by a processing task, wherein the match space comprises the plurality of comparison objects and the plurality of reference objects; and places one or more processing tasks in respective one or more local cache snapshots associated with matching components of a plurality of matching components that perform the processing tasks from the task pool based on the task descriptions, where the distribution component places the one or more processing tasks based upon respective global scores for pairwise combinations of local cache snapshots and task descriptions, wherein the respective global scores are indicative of amounts of previously cached data of comparison objects and references objects in the local cache snapshots associated with previous pairwise comparisons of comparison objects and references objects by the matching components that correspond to comparison objects and references objects of the respective subsets of the plurality of comparison objects and the plurality of reference objects for which the pairwise comparison will be performed by the processing tasks associated the task descriptions; and wherein the plurality of matching components respectively select the processing tasks from the task pool based on respective prioritized scheduling scores associated with the distinct processing tasks, and a prioritized scheduling score is assigned based at least upon how recently copyrighted live events recorded in reference objects associated with the processing task occurred.

2. The system of claim 1, wherein the respective task descriptions include location data for information, configuration settings and task identifiers related to the subset of the plurality of comparison objects and the plurality of reference objects for which the pairwise comparison will be performed by the processing task.

3. The system of claim 1, wherein matching components of the plurality of matching components decouple and couple to the task pool independently from one another at any given time.

4. The system of claim 1, wherein at least one matching component continuously polls the task pool for unclaimed processing tasks from the distinct processing tasks.

5. The system of claim 1, further comprising a partitioning component that divides the match space into the subsets of the plurality of comparison objects and the plurality of reference objects according a set of parameters.

6. The system of claim 5, wherein the set of parameters include at least one of duration since reception of at least one of a comparison object or a reference object, duration of at least one of the comparison object or the reference object, geographic regions of origination of at least one of the comparison object or the reference object, subject category of at least one of the comparison object or the reference object, media content characteristic of at least one of the comparison object or the reference object, a copyright identified for at least one reference object, a popularity measure of at least one comparison object, or a threshold number of at least one of comparison objects or reference objects to include in a subset.

7. The system of claim 1, further comprising a snapshot component that maintains the plurality of comparison objects static while changing a reference object of the plurality of reference objects that correspond to the distinct processing tasks, or maintains the plurality of reference objects static while changing comparison objects of the plurality of comparison objects that correspond to the distinct processing tasks.

8. The system of claim 1, wherein the distribution component monitors a state of the processing tasks in a local cache snapshot associated with a matching component, and moves the processing task to a local snapshot associated with another matching component in response to the processing task not being completed within an amount of time satisfying a threshold function.

9. A method, comprising:

distributing, by a system including a processor, distinct processing tasks, associated with a match space for a pairwise comparison of a plurality of comparison objects and a plurality of reference objects, to a task pool, wherein respective processing tasks comprise task descriptions related to a subset of the plurality of comparison objects and the plurality of reference objects for which the pairwise comparison will be performed by a processing task, wherein the match space comprises the plurality of comparison objects and the plurality of reference objects;

determining, by the system, respective global scores for pairwise combinations of local cache snapshots associated with matching components of a plurality of matching components and task descriptions, wherein the respective global scores are indicative of amounts of previously cached data of comparison objects and references objects in the local cache snapshots associated with previous pairwise comparisons of comparison objects and references objects by the matching components that correspond to comparison objects and references objects of the respective subsets of the plurality of comparison objects and the plurality of reference objects for which the pairwise comparison will be performed by the processing tasks associated the task descriptions, wherein matching components of the plurality of matching components perform the processing tasks from the task pool based on the task descriptions;

placing, by the system, one or more processing tasks in respective one or more local cache snapshots associated with the matching components of the plurality of matching components based upon the global scores; and wherein the plurality of matching components respectively select the processing tasks from the task pool based on respective prioritized scheduling scores associated with the distinct processing tasks, and a prioritized scheduling score is assigned based at least upon how recently copyrighted live events recorded in reference objects associated with the processing task occurred.

10. The method of claim 9, comprising:

generating, by the system, the subsets of the plurality of comparison objects and the plurality of reference objects according a set of parameters.

11. The method of claim 9, further comprising:

maintaining, by the system, the plurality of comparison objects static while changing a reference object of the plurality of reference objects that correspond to the distinct processing tasks; or maintaining, by the system, the plurality of reference objects static while changing comparison objects of the plurality of comparison objects that correspond to the distinct processing tasks.

12. The method of claim 9, wherein the prioritized scheduling score is assigned further based at least upon view counts associated with at least one of comparison objects or reference objects.

13. A non-transitory computer-readable medium having instructions stored thereon that, in response to execution, cause a system including a processor to perform operations comprising:

distributing distinct processing tasks, associated with a match space for a pairwise comparison of a plurality of comparison objects and a plurality of reference objects, to a task pool, wherein respective processing tasks comprise task descriptions related to a subset of the plurality of comparison objects and the plurality of reference objects for which the pairwise comparison will be performed by a processing task, wherein the match space comprises the plurality of comparison objects and the plurality of reference objects;

determining respective global scores for pairwise combinations of local cache snapshots associated with matching components of a plurality of matching components and task descriptions, wherein the respective global scores are indicative of amounts of previously cached data of comparison objects and references objects in the local cache snapshots associated with previous pairwise comparisons of comparison objects and references objects by the matching components that correspond to comparison objects and references objects of the respective subsets of the plurality of comparison objects and the plurality of reference objects for which the pairwise comparison will be performed by the processing tasks associated the task descriptions, wherein the matching components of the plurality of matching components perform the processing tasks from the task pool based on the task descriptions;

placing one or more processing tasks in respective one or more local cache snapshots associated with the matching components of the plurality of matching components based upon the global scores; and wherein the plurality of matching components respectively select the processing tasks from the task pool based on respective prioritized scheduling scores associated with the distinct processing tasks, and a prioritized scheduling score is assigned based at least upon how recently copyrighted live events recorded in reference objects associated with the processing task occurred.

14. The non-transitory computer-readable medium of claim 13, where the prioritized scheduling score is assigned further based at least upon view counts associated with at least one of comparison objects or reference objects.

* * * * *